US010144188B2

(12) United States Patent
Ando (10) Patent No.: US 10,144,188 B2
(45) Date of Patent: Dec. 4, 2018

(54) TIRE VULCANIZING MOLD

(71) Applicant: TOYO TIRE & RUBBER CO., LTD., Osaka-shi, Osaka (JP)

(72) Inventor: Takahiro Ando, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 46 days.

(21) Appl. No.: 15/368,987

(22) Filed: Dec. 5, 2016

(65) Prior Publication Data

US 2017/0173905 A1   Jun. 22, 2017

(30) Foreign Application Priority Data

Dec. 21, 2015   (JP) .................................. 2015-248718

(51) Int. Cl.
*B29D 30/06* (2006.01)
*B29C 33/10* (2006.01)

(52) U.S. Cl.
CPC .......... *B29D 30/0606* (2013.01); *B29C 33/10* (2013.01); *B29D 2030/0612* (2013.01); *B29D 2030/0617* (2013.01)

(58) Field of Classification Search
CPC ........ B29D 30/0606; B29D 2030/0612; B29D 2030/0617; B29C 33/10
See application file for complete search history.

(56) References Cited

U.S. PATENT DOCUMENTS

| 7,290,996 | B2 * | 11/2007 | Tanaka | B29D 30/0629 |
| | | | | 425/28.1 |
| 7,654,817 | B2 * | 2/2010 | Yagi | B29C 33/10 |
| | | | | 249/141 |
| 9,186,857 | B2 * | 11/2015 | Ohara | B29D 30/0606 |
| 9,873,234 | B2 * | 1/2018 | Ohara | B29D 30/0606 |

FOREIGN PATENT DOCUMENTS

| CN | 203752379 U | 8/2014 |
| JP | 2015-16609 A | 1/2015 |
| WO | 2006/070411 A1 | 7/2006 |

OTHER PUBLICATIONS

Office Action dated Jul. 30, 2018, issued in counterpart Chinese Application No. 201611139922.6, with partial English machine translation. (9 pages).

* cited by examiner

*Primary Examiner* — James P Mackey
(74) *Attorney, Agent, or Firm* — Westerman, Hattori, Daniels & Adrian, LLP (57) ABSTRACT

Provided is a tire vulcanizing mold which includes: a molding surface 18 for forming a tire surface; a recessed groove 22*a* indented from the molding surface 18; a plug mounting hole 20 disposed in a portion of the mold where the recessed groove 22*a* is formed and allowing the inside of the mold and the outside of the mold communicate with each other; and a vent plug 30 fitted in the plug mounting hole 20, wherein the vent plug 30 includes a housing 40 having a cylindrical shape and having a ventilation hole extending (Continued)

from the inside of the recessed groove 22*a* to the outside of the mold on an inner diameter side, and a stem 50 which is inserted into the inner diameter side of the housing 40 and opens/closes the ventilation hole, wherein a mold interior end surface 42 of the housing 40 is disposed more to a mold exterior than the molding surface 18.

6 Claims, 8 Drawing Sheets

PRIOR ART

TIRE VULCANIZING MOLD

CROSS-REFERENCE TO RELATED APPLICATION

This application is based upon and claims the benefit of priority from Japanese Patent Application No. 2015-248718, filed Dec. 21, 2015; the entire contents of which are incorporated herein by reference.

BACKGROUND OF THE INVENTION

1. Field of the Invention

The present invention relates to a tire vulcanizing mold.

2. Description of the Related Art

There has been known a tire vulcanizing mold which is used for molding a pneumatic tire by vulcanization molding. A recessed groove which is indented from a molding surface is formed on an inner surface side of the tire vulcanizing mold such that the recessed groove extends in a tire circumferential direction or in a tire radial direction. A plug mounting hole which allows the inside of the mold and the outside of the mold to communicate with each other is formed in a portion of the mold where the recessed groove is formed, and a vent plug is fitted in the plug mounting hole. The vent plug is provided for discharging air in the inside of the mold to the outside of the mold, and the recessed groove is formed so as to allow air in the inside of the mold to flow toward the vent plug.

As the vent plug, there has been known a vent plug which is formed of only a cylindrical member, and a space on an inner diameter side forms a ventilation hole. When vulcanization molding is performed using the vent plug formed of only the cylindrical member, air in the inside of the mold is discharged to the outside of the mold through the ventilation hole of the vent plug and, thereafter, rubber intrudes into the ventilation hole. As a result, on a tire surface after vulcanization molding, an undesired protrusion (spew) made of rubber intruded into the ventilation hole is formed. When the vent plug is disposed in the portion of the tire where the recessed groove is formed as described above, the spew further projects higher than the projecting portion made of rubber which intrudes into the recessed groove on the tire surface thus giving rise to a drawback in external appearance or the like.

As a means which is generally used for preventing the generation of a spew, there may be a case of a vent plug which includes a housing having a cylindrical shape and having a ventilation hole extending from the inside of a mold to the outside of the mold on an inner diameter side, and a stem which is inserted into the inner diameter side of the housing and opens or closes the ventilation hole (for example, see JP-A-2015-16609, international publication 2006/070411). This vent plug is referred to as a spring vent. In the spring vent, a stem is biased toward the inside of the mold by a resilient member so that a gap formed between the housing and the stem is opened whereby the ventilation hole is brought into an open state. However, when rubber reaches the vent plug and pushes the stem from the inside of the mold at the time of vulcanization molding, the gap formed between the housing and the stem is closed so that the ventilation hole is brought into a closed state. Accordingly, rubber minimally enters the ventilation hole so that a spew is minimally generated.

Figure 10:
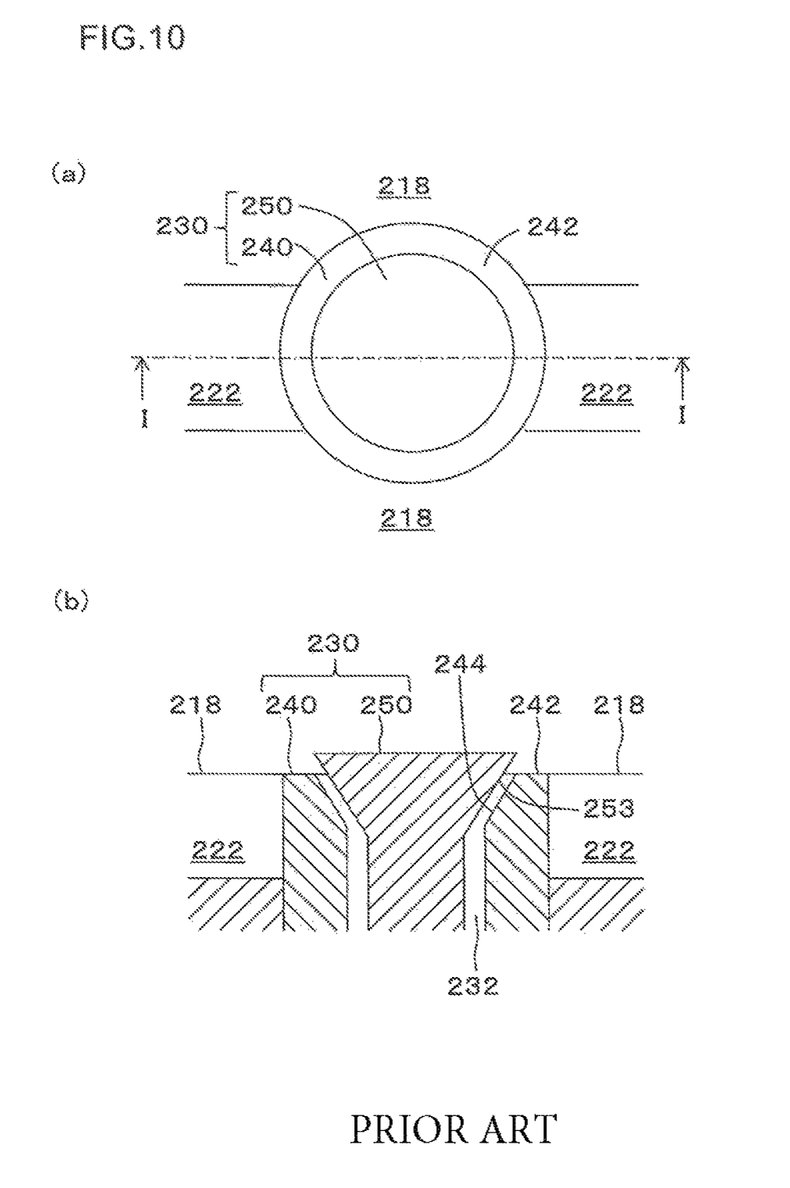
FIG. 10(a) is a view showing an area of a conventional tire vulcanizing mold in the vicinity of a spring vent 230 as viewed from the inside of the mold.
FIG. 10(b) is a cross-sectional view taken along a line I-I in FIG. 10(a).

In view of the above, conventionally, as shown in FIG. 10, there has been used a tire vulcanizing mold where a spring vent 230 is formed in a portion of the tire where a recessed groove 222 is formed. The tire vulcanizing mold includes a spring vent 230 so as to make a mold inner end surface 242 and a molding surface 218 of the housing 240 coplanar with each other.

In JP-A-2015-16609, a tire vulcanizing mold has been proposed where a center line of a housing is inclined with respect to a molding surface, and the housing is disposed more to a mold exterior than a molding surface. In international publication 2006/070411, a tire vulcanizing mold has been proposed where a stem is disposed more to the mold exterior than a molding surface in a state where the ventilation hole is closed.

SUMMARY OF INVENTION

However, conventionally, as shown in FIG. 10, the mold inner end surface 242 of the housing 240 and the molding surface 218 are made coplanar with each other and hence, the flow of air into a ventilation hole 232 of the spring vent 230 from the recessed groove 222 is disrupted by the housing 240. Accordingly, air remains in the inside of the mold thus bringing about the occurrence of a bare (a partial defect on a tire surface which occurs due to the retention of air in the inside of the mold).

In the case where the vent plug is formed of only the cylindrical member, it is possible to ensure the flow of air into the ventilation hole of the vent plug from the recessed groove by shaving a portion of the vent plug protruding into the inside of the recessed groove. However, in the case where the vent plug is the spring vent 230, when a portion of the spring vent 230 which protrudes into the inside of the recessed groove 222 is shaved, contact surfaces 244, 253 formed between the housing 240 and the stem 250 for closing the ventilation hole 232 are shaved. As a result, the ventilation hole 232 cannot be closed. Accordingly, it is impossible to ensure the flow of air into the ventilation hole 232 from the recessed groove 222 by shaving the spring vent 230.

The present invention has been made in view of the above-mentioned circumstances, and it is an object of the present invention to provide a tire vulcanizing mold where a recessed groove indented from a molding surface is formed and a spring vent is formed in a portion of the mold where the recessed groove is formed, wherein the tire vulcanizing mold is configured not to disrupt the flow of air into a ventilation hole of a spring vent from the recessed groove.

According to one aspect of the present invention, there is provided a tire vulcanizing mold which includes: a molding surface for forming a tire surface; a recessed groove indented from the molding surface; a plug mounting hole disposed in a portion of the mold where the recessed groove is formed and allowing the inside of the mold and the outside of the mold communicate with each other; and a vent plug fitted in the plug mounting hole, wherein the vent plug includes a housing having a cylindrical shape and having a ventilation hole extending from the inside of the recessed groove to the outside of the mold on an inner diameter side, and a stem which is inserted into the inner diameter side of the housing and opens/closes the ventilation hole, wherein a mold interior end surface of the housing is disposed more to a mold exterior than the molding surface.

In the tire vulcanizing mold according to one aspect of the present invention, the end surface of the housing on the inner side of the mold is disposed more to the mold exterior than the molding surface and hence, the flow of air into the ventilation hole of the spring vent from the recessed groove is not disrupted.

DESCRIPTION OF PREFERRED EMBODIMENTS

An embodiment of the present invention is described with reference to drawings. In some cases, the drawings are depicted in an exaggerated manner for facilitating the explanation of the present invention.

Figure 1:
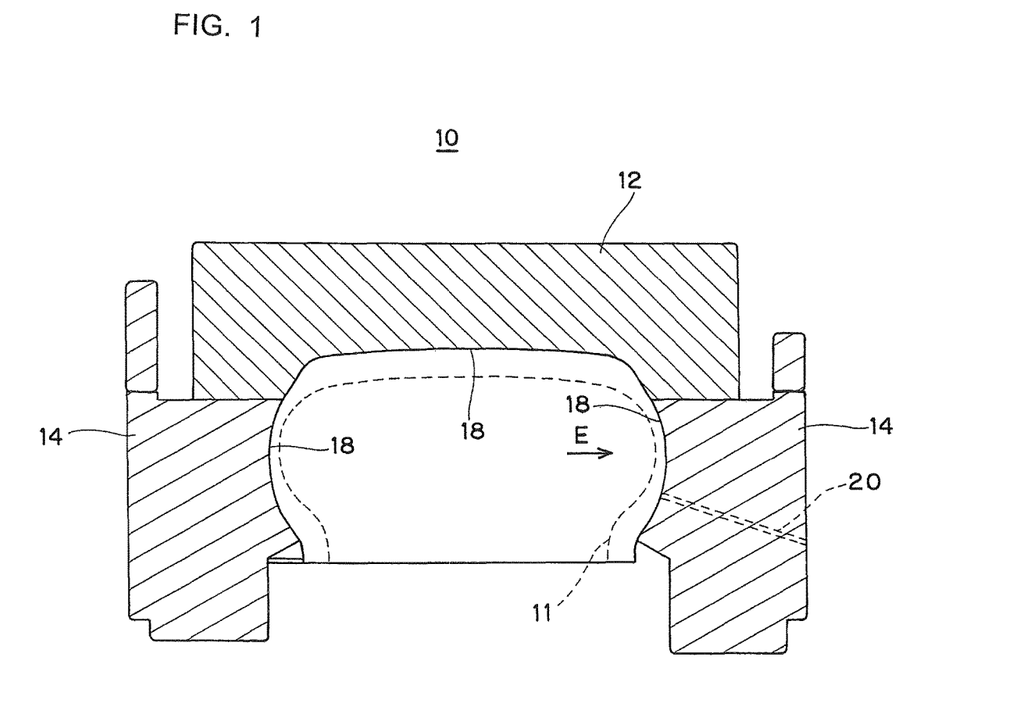
FIG. 1 is a cross-sectional view in an axial direction of a tire vulcanizing mold 10 according to an embodiment.

FIG. 1 shows a tire vulcanizing mold 10 of this embodiment. The tire vulcanizing mold 10 includes a plurality of sectors 12 arranged around the circumference; a pair of side plates 14 disposed on both sides in an axial direction of the circumference which the plurality of sectors 12 form; and a pair of bead rings not shown in the drawings. The side plate 14 is formed into a ring shape having a large width as viewed from the inside of the tire. During vulcanizing molding, an unvulcanized tire 11 is set in the inside of the tire vulcanizing mold 10 as indicated by a broken line in the drawing. The sectors 12, the side plates 14 and the bead rings are molding members for molding a pneumatic tire, and mold inner surfaces of these members form a molding surface 18 for molding a tire surface. The plurality of sectors 12 are provided mainly for forming a tread portion of the pneumatic tire. The pair of side plates 14 is provided for forming side portions of the pneumatic tire, and the pair of bead rings is provided for molding bead portions of the pneumatic tire. Although a material for forming the sectors 12 is not limited, aluminum or an aluminum alloy (for example, Al—Cu based alloy, Al—Mg based alloy, Al—Mn based alloy and Al—Si based alloy) is used. Although a material for forming the side plates 14 and a material for forming the bead rings are not limited, for example, steel material such as general-construction-use rolled steel (for example, SS400) or the like can be used. A material for forming the side plate 14 and a material for forming the bead ring may be equal or different from each other.

Figure 2:
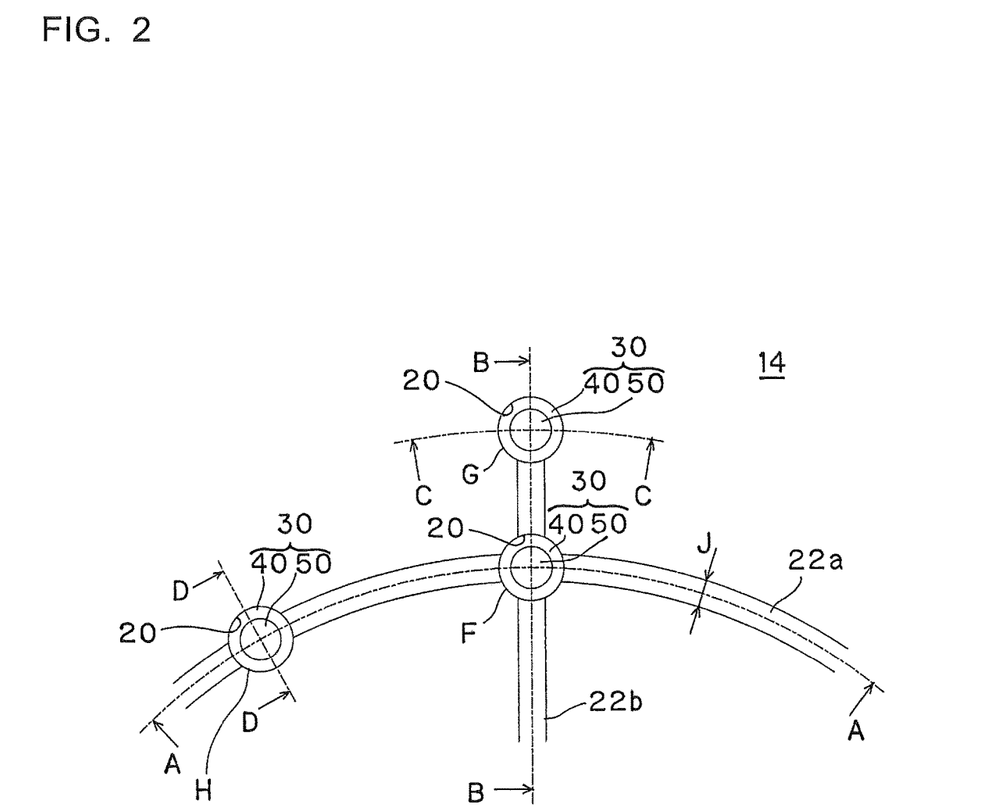
FIG. 2 is a view showing a portion of a molding surface 18 of a side plate 14 as viewed in a direction indicated by an arrow E in FIG. 1.

As shown in FIG. 2, a plurality of recessed grooves which are indented from the molding surface 18 are formed on the mold inside of a molding member such as the side plate 14, for example. Usually, the recessed groove is formed at a place where air is liable to remain lastly at the time of performing vulcanization molding. The recessed groove is formed of: a circumferential recessed groove 22a which extends in the circumferential direction of the side plate 14; and a radial recessed groove 22b which extends in a radial direction of the side plate 14. The circumferential direction of the side plate 14 agrees with the tire circumferential direction of the pneumatic tire molded by vulcanization using the tire vulcanizing mold 10, and the radial direction of the side plate 14 agrees with the tire radial direction of the pneumatic tire molded by vulcanization using the tire vulcanizing mold 10. Although only one circumferential recessed groove 22a and only one radial recessed groove 22b are depicted in FIG. 2, both the number of circumferential recessed groove 22a and the number of the radial recessed grooves 22b may be two or more. The circumferential recessed groove 22a and the radial recessed groove 22b intersect with each other. A width J of the recessed groove is set to a value which falls within a range of from 0.3 mm to 1.0 mm inclusive, for example. A depth of the recessed groove is set to a value which falls within a range of from 0.3 mm to 1.0 mm inclusive, for example.

A plug mounting hole 20 is disposed in places where the recessed groove is formed. The plug mounting hole 20 is a hole having a circular cross section and extends toward the mold exterior from the mold inside. As illustrated by a broken line in FIG. 1, the plug mounting hole 20 opens on the molding surface 18 and a surface of the mold exterior of the side plate 14. Accordingly, the inside of the mold and the outside of the mold are made to communicate with each other through the plug mounting hole 20. The place where the plug mounting hole 20 is disposed is, for example, as shown in FIG. 2, a place F where the circumferential recessed groove 22a and the radial recessed groove 22b intersect with each other in a cruciform, a place G where the circumferential recessed groove 22a or the radial recessed groove 22b terminates, a place H which is disposed in the midst of the extension between the circumferential recessed groove 22a and the radial recessed groove 22b, a place where the circumferential recessed groove 22a and the radial recessed groove 22b intersect with each other in a T shape although not shown in the drawing and the like. "The plug mounting hole 20 is disposed in the place where the recessed groove is formed" means that the plug mounting hole 20 is disposed such that at least a portion of such a recessed groove in the width direction and at least a portion of the plug mounting hole 20 overlap with each other. However, as described in the drawing, it is desirable that the plug mounting hole 20 be disposed such that the plug mounting hole 20 overlaps with the whole recessed groove in the width direction (in other words, in a state where the plug mounting hole 20 divides a groove bottom surface of the recessed groove).

Figure 3:
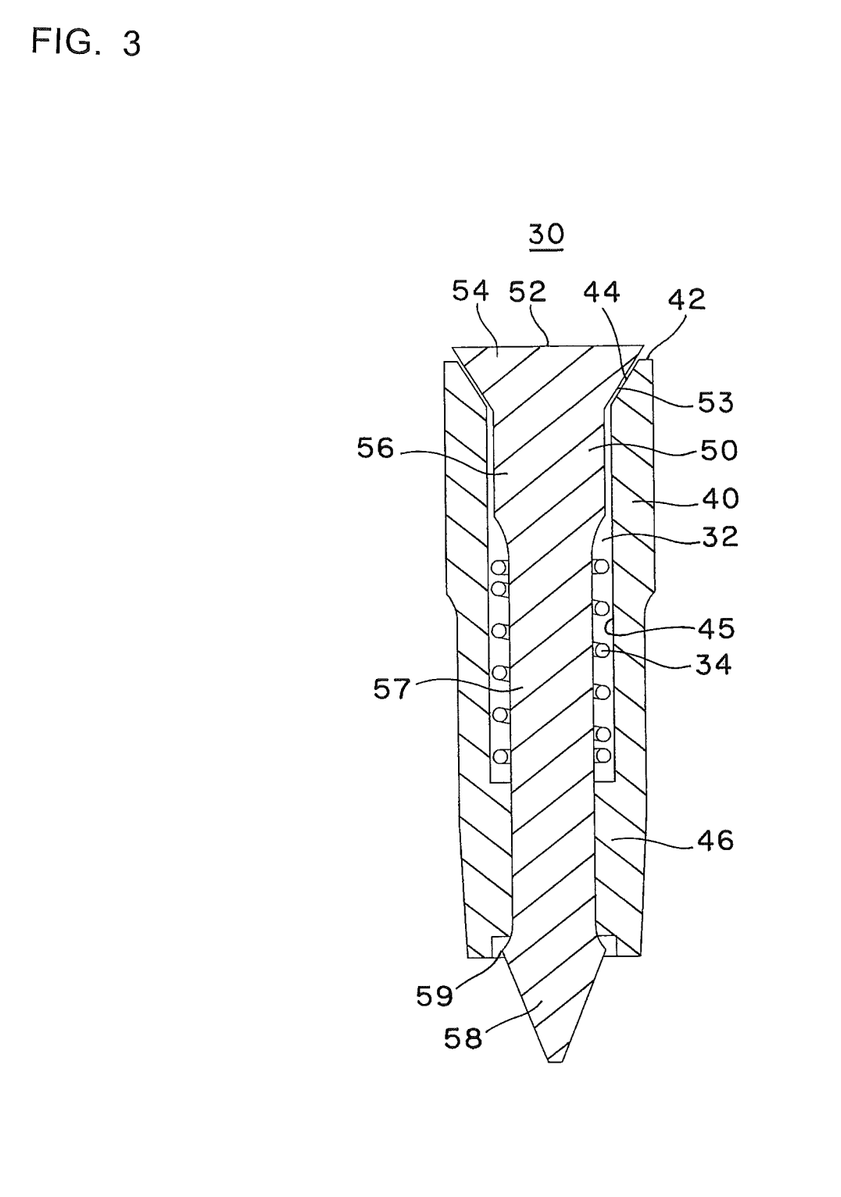
FIG. 3 is a cross-sectional view in an axial direction of a spring vent 30.

A spring vent 30 which is one type of a vent plug is fitted in each plug mounting hole 20. As shown in FIG. 3, the spring vent 30 includes: a cylindrical housing 40 which has a ventilation hole 32 on an inner diameter side; and a stem 50 which is inserted into an inner diameter side of the housing 40 and opens/closes the ventilation hole 32. An upper side of FIG. 3 defines the mold interior, and a lower side of FIG. 3 defines the mold exterior. An outer diameter of the housing 40 is set slightly larger than an inner diameter of the plug mounting hole 20 and hence, the spring vent 30 can be fitted in the plug mounting hole 20.

The ventilation hole 32 formed in the housing 40 extends in the same direction as the plug mounting hole 20, and makes the inside of the mold and the outside of the mold communicate with each other. With respect to a surface which forms an inner diameter surface of the housing 40, that is, the ventilation hole 32, a surface which is continuously formed from a mold interior end surface 42 of the housing 40 in a depth direction of the housing 40 (that is, toward the mold exterior) is formed into a tapered surface such that a diameter of the surface is gradually decreased as the surface extends toward the mold exterior. This tapered surface is a contact surface 44 which is brought into contact with the stem 50 when the ventilation hole 32 is closed. With respect to an inner diameter surface of the housing 40, a surface which is continuously formed from the contact surface 44 to the mold exterior (referred to as an intermediate diameter surface 45) has a fixed diameter. Further, in the vicinity of an end portion of the mold exterior of the housing 40, a small diameter portion 46 where an inner diameter is set smaller than that of the intermediate inner diameter surface 45 is disposed. Although a diameter of the housing 40 is not limited, the diameter of the housing 40 is set to a value which falls within a range of from 1.6 mm to 4.0 mm inclusive, for example.

The stem 50 includes: a head portion 54 having a mold interior end surface 52; a first trunk portion 56 which is continuously formed toward the mold exterior from the head portion 54; a second trunk portion 57 which is continuously formed toward the mold exterior from the first trunk portion 56; and a distal end portion 58 which is continuously formed from the second trunk portion 57. An outer diameter surface 53 of the head portion 54 is formed into a tapered surface such that a diameter of the outer diameter surface 53 is gradually decreased toward the mold exterior. The outer diameter surface 53 is a surface which is brought into contact with the contact surface 44 of the housing 40 when the ventilation hole 32 is closed.

An outer diameter of the first trunk portion 56 and an outer diameter of the second truck portion 57 are set smaller than an inner diameter of the intermediate inner diameter surface 45 of the housing 40, and a gap is formed between outer diameter surfaces of the first trunk portion 56 and the second trunk portion 57 and the intermediate inner diameter surface 45 of the housing 40. The second trunk portion 57 has an outer diameter smaller than an outer diameter of the first trunk portion 56, and a portion of the second trunk portion 57 is positioned on an inner diameter side of the small diameter portion 46 of the housing 40. A ventilation portion not shown in the drawing is formed between the second trunk portion 57 and the small diameter portion 46. With such a structure, air which enters between the outer diameter surface 53 of the head portion 54 of the stem 50 and the contact surface 44 of the housing 40 passes between the outer diameter surfaces of the first trunk portion 56 and the second trunk portion 57 and the intermediate inner diameter surface 45 and, thereafter, passes through the ventilation portion formed between the second trunk portion 57 and the small diameter portion 46, and is discharged to the mold exterior by the spring vent 30.

An outer diameter of the distal end portion 58 of the stem 50 at an outer diameter side peak 59 is set larger than an outer diameter of the small diameter portion 46 of the housing 40. Since the distal end portion 58 is disposed more to the mold exterior than the small diameter portion 46 of the housing 40, the distal end portion 58 cannot move into the mold inside beyond the small diameter portion 46. Accordingly, it is possible to prevent the stem 50 from being removed to the mold interior from the housing 40.

A spring 34 which forms a part of the spring vent 30 is disposed between the small diameter portion 46 of the housing 40 and the first trunk portion 56 of the stem 50. A different resilient member may be disposed in place of the spring 34. The spring 34 biases the stem 50 toward the mold interior. Accordingly, the mold interior end surface 52 of the head portion 54 of the stem 50 constantly projects more to the mold interior than the mold interior end surface 42 of the housing 40 and hence, a gap is formed between the contact surface 44 of the housing 40 and the outer diameter surface 53 of the head portion 54 of the stem 50 whereby the ventilation hole 32 is brought into an open state. When the ventilation hole 32 is in an open state, air in the inside of the mold is discharged to the outside of the mold through the ventilation hole 32.

On the other hand, when the stem 50 is pushed to the mold exterior against a biasing force of the spring 34, the contact surface 44 of the housing 40 and the outer diameter surface 53 of the head portion 54 of the stem 50 are brought into contact with each other and hence, the gap formed between the contact surface 44 and the outer diameter surface 53 is closed whereby the ventilation hole 32 is brought into a closed state. Accordingly, air in the inside of the mold is not discharged to the outside of the mold.

Although a material for forming the housing 40 and the material for forming the stem 50 are not limited, for example, a steel material such as a rolled steel for general structure (for example, SS400), copper or the like can be used. A material for forming the housing 40 and a material for forming the stem 50 may be equal or different from each other.

Figure 4:
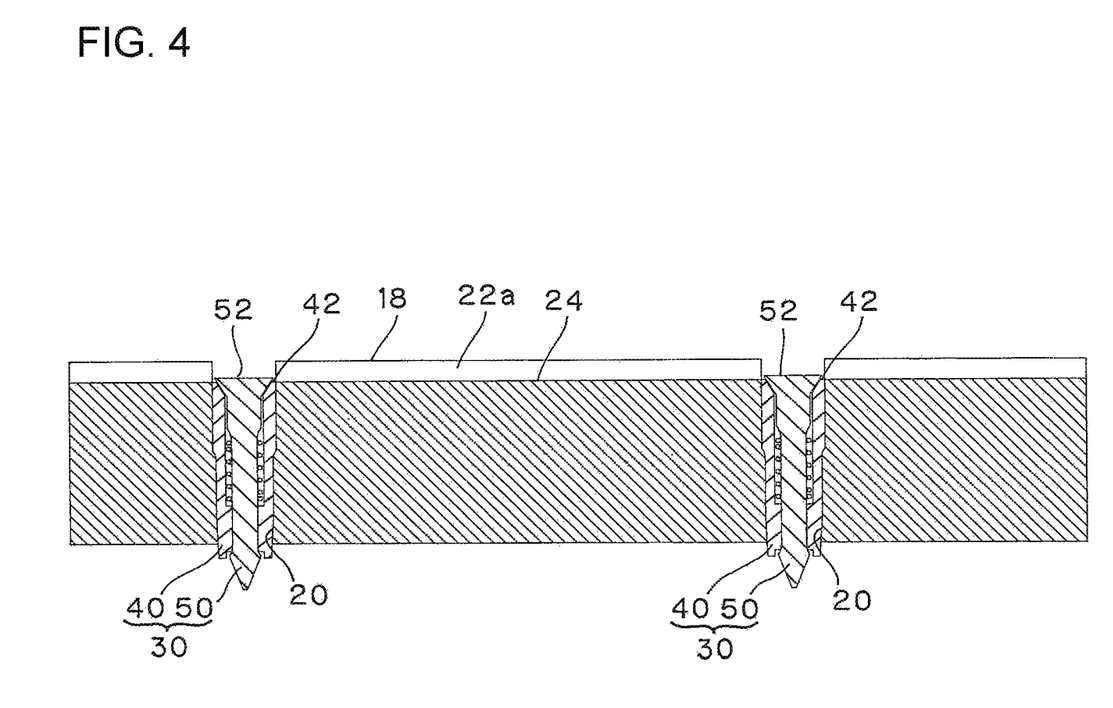
FIG. 4 is a cross sectional view taken along a line A-A in FIG. 2.
Figure 5:
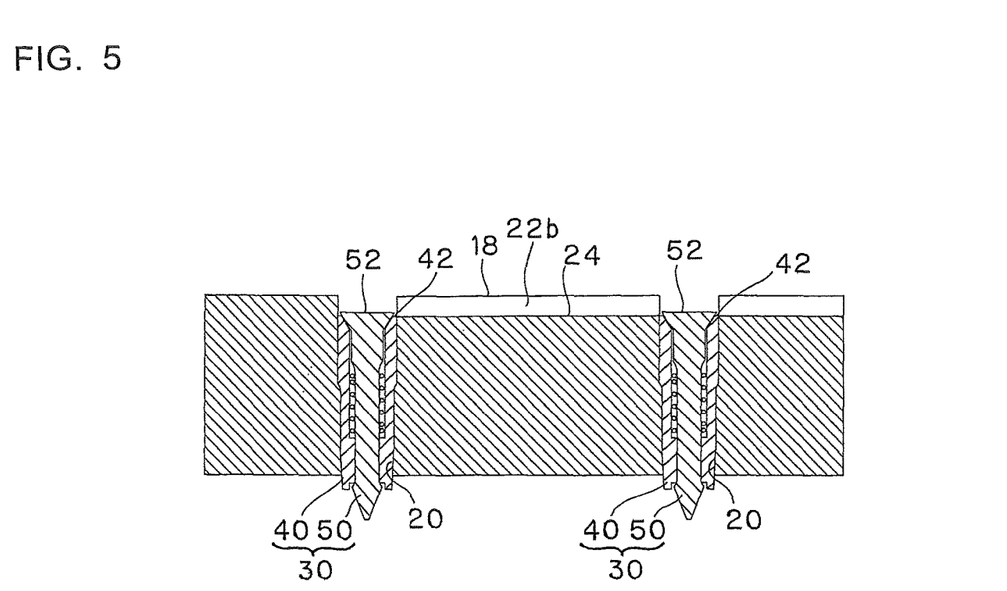
FIG. 5 is a cross sectional view taken along a line B-B in FIG. 2.
Figure 6:
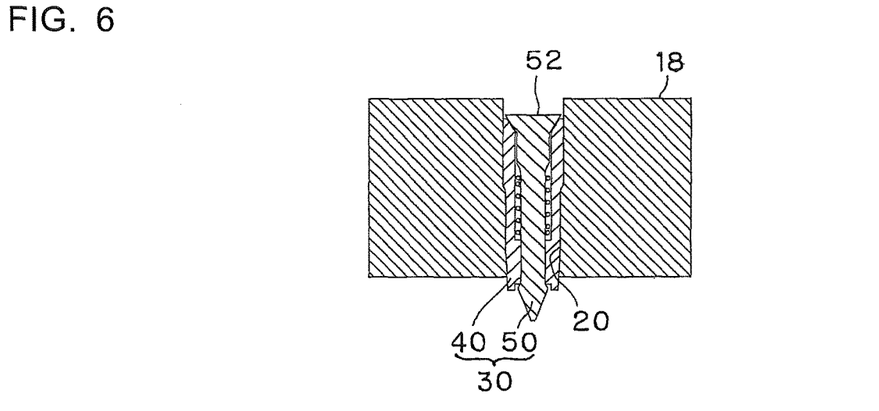
FIG. 6 is a cross sectional view taken along a line C-C and a line D-D in FIG. 2.
Figure 7:
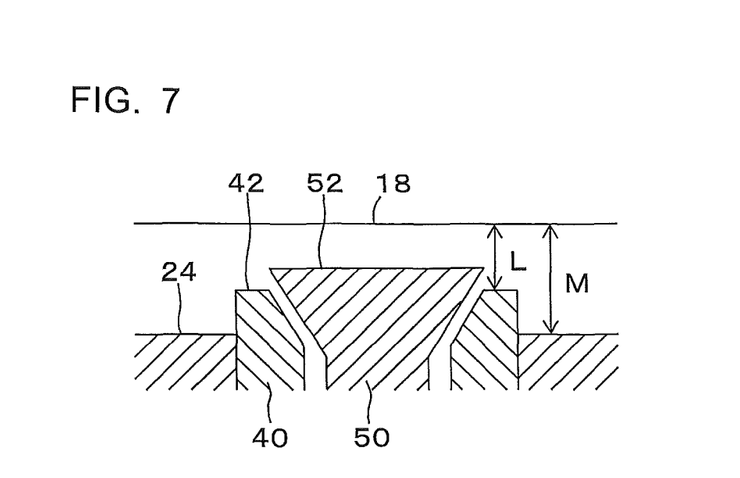
FIG. 7 is a cross-sectional view in a housing axial direction of an area of a housing 40 in the vicinity of a mold interior end surface 42 when a relationship of 0.4×M=L is set.
Figure 8:
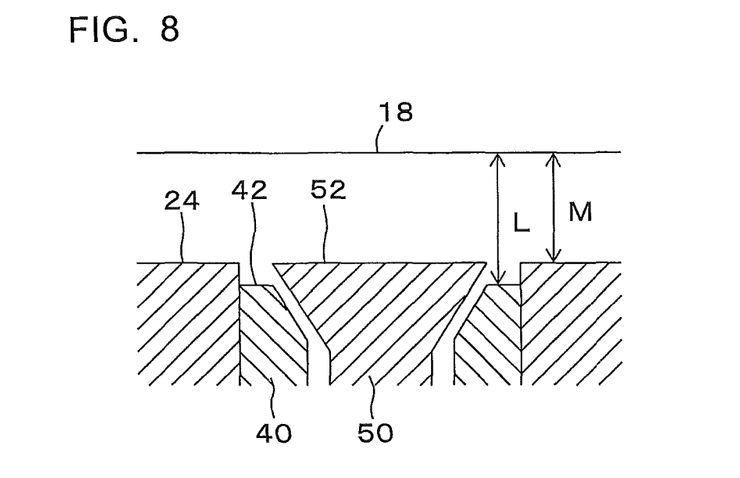
FIG. 8 is a cross-sectional view in a housing axial direction of the area of the housing 40 in the vicinity of the mold interior end surface 42 when a relationship of 1.2×M=L is set.

As shown in FIG. 4 to FIG. 6, the mold interior end surface 42 of the housing 40 is more to the mold exterior than the molding surface 18 and is disposed near the groove bottom 24 of the recessed groove. Accordingly, in a state where a surface of an unvulcanized tire is brought into contact with the molding surface 18, a gap is formed between the surface of the unvulcanized tire and the mold interior end surface 42 of the housing 40 and hence, air can pass through the gap. It is desirable to set the relationship between a depth L of the mold interior end surface 42 of the housing 40 from the molding surface 18 and a depth M of the recessed groove to $0.4 \times M \leq L \leq 1.2 \times M$ (see FIG. 7 and FIG. 8). FIG. 7 shows the relationship between the groove bottom 24 of the recessed groove and the mold interior end surface 42 of the housing 40 when the relationship of $0.4 \times M = L$ is set, and FIG. 8 shows the relationship between the groove bottom 24 of the recessed groove and the mold interior end surface 42 of the housing 40 when the relationship of $1.2 \times M = L$ is set. In FIG. 4 and FIG. 5, the depth L of the mold interior end surface 42 of the housing 40 from the molding surface 18 agrees with the depth M of the recessed groove.

In performing vulcanization molding of a pneumatic tire using the tire vulcanizing mold 10 on which the spring vent 30 is mounted, an unvulcanized tire is set in the inside of the tire vulcanizing mold 10, and the molding members such as the side plates 14 are held at a vulcanization molding temperature. Then, a bladder not shown in the drawing which is disposed in the inside of the set unvulcanized tire is inflated so that a surface of the unvulcanized tire is pushed to the molding surface 18. As a result, air remaining in the inside of the tire vulcanizing mold 10 is pushed into the inside of the recessed groove, and flows through the inside of the recessed groove in the direction toward the spring vent 30.

At this stage of operation, air can pass through the space which is formed between the surface of the unvulcanized tire and the mold interior end surface 42 of the housing 40 as described above and hence, air which reaches a periphery of the spring vent 30 passes through such a gap, and is discharged to the outside of the mold from the spring vent 30. When rubber of the unvulcanized tire flows toward the spring vent 30 and pushes the stem 50 to the mold exterior, the ventilation hole 32 is brought into a closed state so that discharging of air to the outside of the mold is finished.

In this manner, in the tire vulcanizing mold 10 of this embodiment, the mold interior end surface 42 of the housing 40 is disposed more to the mold exterior than the molding surface 18 and hence, the flow of air toward the ventilation hole 32 from the recessed groove is not disrupted. Accordingly, a bare is hardly generated on the tire surface.

In the above-mentioned configuration, when the depth L of the mold interior end surface 42 of the housing 40 from the molding surface 18 is 0.4 times or more as large as the depth M of the recessed groove, it is possible to ensure a sufficient gap between the surface of the unvulcanized tire and the mold interior end surface 42 of the housing 40 and hence, air can easily pass through the recessed groove and can reach the ventilation hole 32. Further, by setting the depth L of the mold interior end surface 42 of the housing 40 from the molding surface 18 to a value which is 1.2 times or less as large as the depth of the recessed groove, even when rubber intrudes into a portion ranging from the groove bottom 24 of the recessed groove to the mold interior end surface 42 of the housing 40, a projection which is large enough to affect an external appearance quality is not formed on the tire surface by such intruded rubber.

Air which flows though the inside of the recessed groove is liable to be collected at the place where the circumferential recessed groove 22a and the radial recessed groove 22b intersect with each other. In this embodiment, the spring vent 30 is disposed in such a place and hence, it is possible to smoothly discharge a large amount of air to the outside of the mold.

Various modifications, changes, omissions and the like can be applied to the embodiment described heretofore without departing from the gist of the present invention. For example, while characters, symbols or the like are formed on a tire surface as projecting portions, recessed portions for forming the projecting portions on the tire surface are formed on the molding member. However, air is liable to remain in the recessed portions during vulcanization molding. In view of the above, a recessed groove substantially equal to the recessed groove of the above embodiment is formed on the recessed portion, and the spring vent 30 may be formed at the place where the recessed groove is formed in the same manner as described above.

Figure 9:
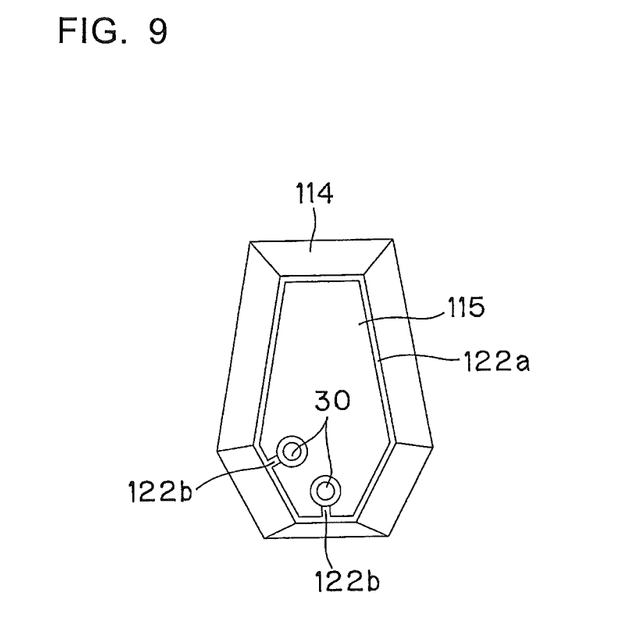
FIG. 9 is a view of a recessed portion 114 of the side plate 14 as viewed from the inside of the mold.

FIG. 9 shows a recessed portion 114 formed on a side plate 14 for forming a projecting portion expressing a character, symbol or the like on a tire side portion. A recessed groove 122a which turns around corner portions of a bottom surface 115 is formed in the recessed portion 114. Since it is difficult to form a plug mounting hole in the corner portions of the bottom surface 115, a guide recessed groove 122b which is continuously formed with the recessed groove 122a and extends toward a center side of the bottom surface 115 is formed, and a spring vent 30 is disposed at a place in an end portion of the guide recessed groove 122b. The spring vent 30 is disposed such that a mold inner end surface of a housing is positioned more to the mold exterior than a molding surface. With such a configuration, air can be discharged to the mold exterior from the corner portion of the recessed portion 114 where air is liable to remain.

Vulcanizing mold of pneumatic tires was performed using tire vulcanizing molds of a comparison example and examples shown in Table 1, and the presence or the non-presence of a bare was checked. In all tire vulcanizing molds, recessed grooves substantially equal to the recessed grooves of the above-mentioned embodiment were formed, and a spring vent was disposed at places where the recessed grooves were formed. In the comparison example 1, in the same manner as the configuration shown in FIG. 10, a mold inner end surface of a housing of a spring vent agreed with a molding surface. In the example 1, a depth of a mold inner end surface of a housing from a molding surface is half of a depth of a recessed groove. In the example 2, in the same manner as the configuration shown in FIG. 4 and FIG. 5, a depth of a mold inner end surface of housing from a molding surface agreed with a depth of a recessed groove.

A result of the check is described in Table 1. Although a bare was generated in the comparison 1, no bare was generated in the example 1 and the example 2. From this fact, it was confirmed that air remained in the inside of the tire vulcanizing mold at the time of vulcanization molding in the tire vulcanizing mold of the comparison example, while air does not remain in the inside of the tire vulcanizing mold at the time of vulcanization molding in the tire vulcanizing molds of the examples 1, 2.

TABLE 1

|  | Comparison example 1 | Example 1 | Example 2 |
|---|---|---|---|
| Technical feature | mold inner end surface of housing and molding surface agree with each other | depth of mold inner end surface of housing from molding surface being half of depth of recessed groove | depth of mold inner end surface of housing from molding surface and depth of recessed groove being equal |
| Presence or non-presence of bare | present | not present | not present |

What is claimed is:

1. A tire vulcanizing mold comprising:
    a molding surface for forming a tire surface;
    a recessed groove indented from the molding surface;
    a plug mounting hole disposed in a portion of the mold where the recessed groove is formed and allowing the inside of the mold and the outside of the mold to communicate with each other; and
    a vent plug fitted in the plug mounting hole,
    wherein the vent plug includes a housing having a cylindrical shape and having a ventilation hole extending from the inside of the recessed groove to the outside of the mold on an inner diameter side, and a stem which is inserted into the inner diameter side of the housing and opens/closes the ventilation hole,
    wherein the recessed groove has a depth of 0.3 mm to 1.0 mm and a width of 0.3 mm to 1.0 mm, and
    wherein a mold interior end surface of the housing is disposed more to a mold exterior than the molding surface.

2. The tire vulcanizing mold according to claim 1, wherein a relationship between a depth L of the mold interior end surface of the housing from the molding surface and a depth M of the recessed groove is expressed by a following formula $0.4 \times M \leq L \leq 1.2 \times M$.

3. The tire vulcanizing mold according to claim 1, wherein the recessed groove comprises a circumferential recessed groove extending in a tire circumferential direction in a tire side portion of the molding surface and a radial recessed groove extending in a tire radial direction in the tire side portion of the molding surface,
   wherein the circumferential recessed groove and the radial recessed groove intersect each other on the tire side portion of the molding surface, and the vent plug is disposed on said intersect of the circumferential recessed groove and the radial recessed groove.

4. The tire vulcanizing mold according to claim 2, wherein the recessed groove comprises a circumferential recessed groove extending in a tire circumferential direction in a tire side portion of the molding surface and a radial recessed groove extending in a tire radial direction in the tire side portion of the molding surface,
   wherein the circumferential recessed groove and the radial recessed groove intersect each other on the tire side portion of the molding surface, and the vent plug is disposed on said intersect of the circumferential recessed groove and the radial recessed groove.

5. The tire vulcanizing mold according to claim 1, wherein an outer diameter of the housing is larger than an inner diameter of the plug mounting hole.

6. The tire vulcanizing mold according to claim 1, wherein the plug mounting hole divides a groove bottom surface of the recessed groove.

* * * * *